(12) United States Patent
Gregory et al.

(10) Patent No.: US 7,266,849 B1
(45) Date of Patent: Sep. 4, 2007

(54) DETERRING UNAUTHORIZED USE OF ELECTRONIC DEVICES

(75) Inventors: Anne Gregory, Los Gatos, CA (US); James A. Sutton, Portland, OR (US); Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/457,492

(22) Filed: Dec. 8, 1999

(51) Int. Cl.
*G06F 21/20* (2006.01)
*G06F 21/22* (2006.01)
*G06F 21/00* (2006.01)
*G08B 26/00* (2006.01)

(52) U.S. Cl. .................. 726/34; 726/35; 726/36; 713/193; 713/194

(58) Field of Classification Search ................ 713/200, 713/201; 340/825.31, 571; 380/25; 395/186
See application file for complete search history.

(56) References Cited

U.S. PATENT DOCUMENTS

| | | | | |
|---|---|---|---|---|
| 5,892,906 A | * | 4/1999 | Chou et al. | 713/202 |
| 6,032,257 A | * | 2/2000 | Olarig et al. | 726/35 |
| 6,163,693 A | * | 12/2000 | Rydbeck | 455/418 |
| 6,553,495 B1 | * | 4/2003 | Johansson et al. | 726/35 |
| 6,615,356 B1 | * | 9/2003 | Byun | 726/36 |
| 6,654,890 B1 | * | 11/2003 | Girard | 726/35 |
| 6,950,946 B1 | * | 9/2005 | Droz et al. | 340/5.74 |
| 6,981,164 B2 | * | 12/2005 | Bullman et al. | 713/324 |
| 7,020,785 B2 | * | 3/2006 | Kim et al. | 726/36 |
| 2002/0019938 A1 | * | 2/2002 | Aarons | 713/168 |

OTHER PUBLICATIONS

"Theft Protection for Network Attached Devices", IBM Technical Disclosure □□Bulletin vol. 39, No. 7, pp. 271-272 (Jul. 1996).*

* cited by examiner

*Primary Examiner*—Syed A. Zia
(74) *Attorney, Agent, or Firm*—Fish & Richardson P.C.

(57) ABSTRACT

A method for deterring unauthorized use of an electronic device is described. The method includes installing security data in a protected storage area, installing a security routine operable to check for the security data, and prompting a user for identity information if the security data is found, before permitting use of the device. In an implementation, the device is shut down if the identity information is incorrect, and manufacturer contact information may be displayed before shutting down. But if the user responds correctly, the activation process is continued to enable normal operation of the device.

22 Claims, 2 Drawing Sheets

DETERRING UNAUTHORIZED USE OF ELECTRONIC DEVICES

BACKGROUND OF THE INVENTION

The invention pertains to a method for deterring unauthorized use of electronic devices.

Several methods of theft prevention, theft deterrence, and device tracking for retrieval of electronic devices have been developed. For example, commercially available tracking agent software resides on a personal computer (PC) and automatically calls in the location of the PC at preset intervals to a monitoring center. If the PC is lost or stolen, a recovery service mode is implemented. When the PC next calls the monitoring center, a location is determined. A recovery service procedure can then be put into action.

Electronic devices may be stolen from the distribution channel (e.g. while the products are being shipped to warehouses, retail outlets or wholesalers). These devices may be stolen before any registration process has been initiated.

SUMMARY OF THE INVENTION

Presented is a method for deterring unauthorized use of an electronic device. The technique includes installing security data in a protected storage area of the device, installing a security routine operable during an activation process to check for the security data when the device is powered on, and prompting a user for identity information if the security data is found, before permitting use of the device. In an implementation, the device is shut down if the identity information is incorrect, and manufacturer contact information may be displayed before shutting down. But if the user responds correctly, the activation process continues so that the device is operable.

It is contemplated that manufacturers will install the security routine and security data to be accessed early in the boot-up process for PC's, or early in the initialization or activation process for other electronic devices. The technique may be advertised and marketed so that the public is aware of how the devices are protected. Consequently, the invention provides a deterrent to theft in the distribution channel because thieves realize that devices protected by the invention will not operate until an authorized user is first authenticated.

Other advantages and modifications of the invention will be apparent in view of the following detailed description and the drawings.

DETAILED DESCRIPTION

Figure 1:
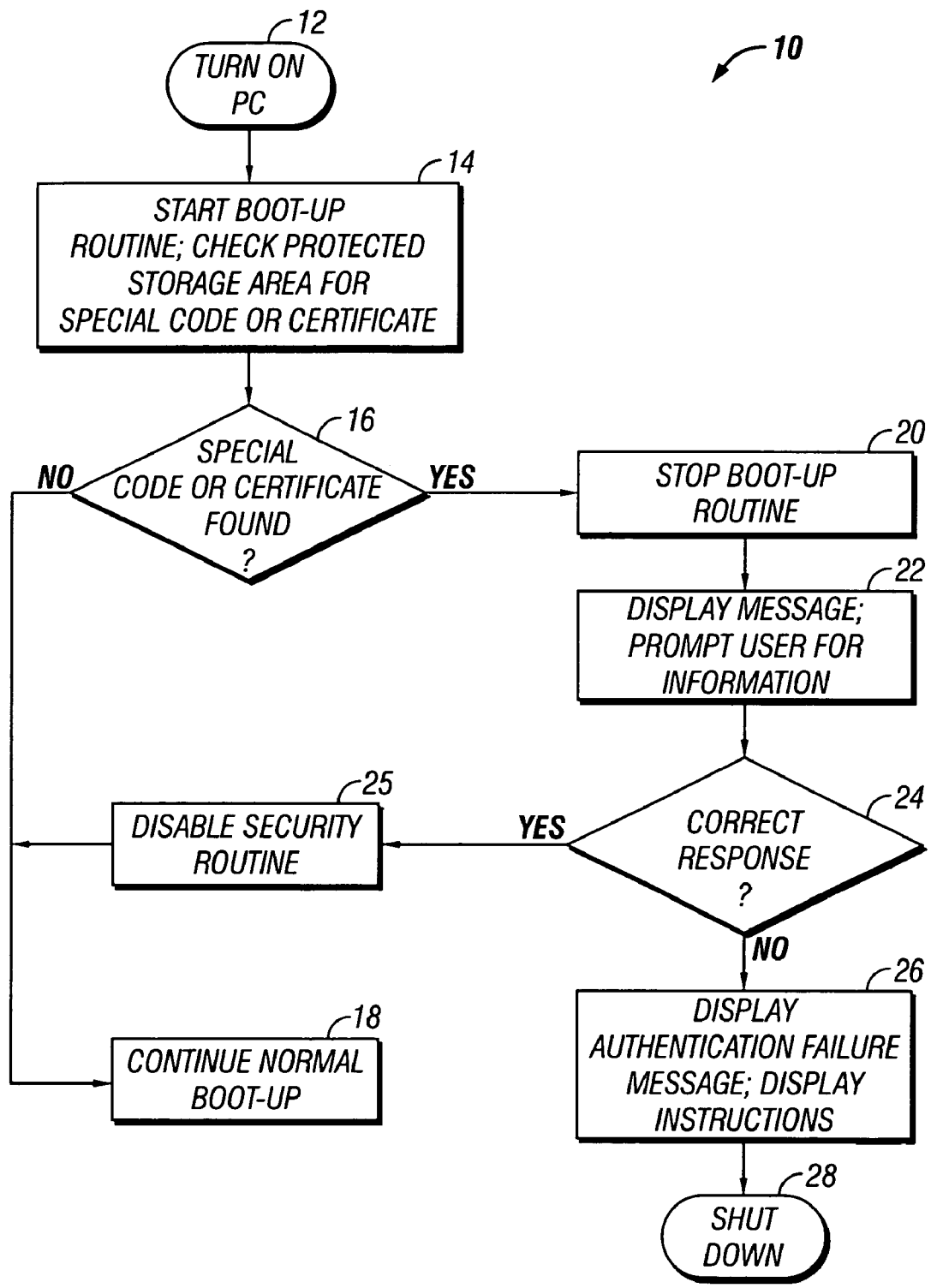
FIG. 1 is a flowchart of an implementation of a technique for deterring unauthorized use of an electronic device according to the invention.

FIG. 1 is a flowchart 10 of an implementation of a technique for deterring unauthorized use of an electronic device such as a personal computer (PC). Although the method can be designed to work with various electronic devices, it is particularly suitable for use in deterring theft of PCs, including both desktop and laptop models. In an implementation, before shipping a PC from a factory, the manufacturer installs a software security routine that executes early in a boot-up process. The manufacturer also installs a special code or a digital certificate in a protected storage area for user authentication. (The pre-installed special code or certificate can take many forms, examples of which are described below.)

Referring to FIG. 1, a PC is turned on in step 12, and the central processing unit (CPU) starts a boot-up process in step 14. In particular, software called a boot program is initiated which includes routines used to ensure that all components of the PC are operating correctly. The boot program may be permanently stored in read-only memory (ROM) chips that contain the PC's Basic Input/Output System (BIOS). In step 14, the pre-installed security routine is executed early in the boot-up process to check a protected storage area such as the BIOS for a special code or for a certificate that identifies the entity or entities permitted to use the PC. In step 16 if the special code is not located, then in step 18 the boot-up procedure is allowed to continue so that the PC becomes operational. But if a special code or certificate is found, then in step 20 the boot process stops. In step 22, a message may then be displayed on the PC's monitor reciting that the system has been "locked for shipping", and that prompts the user for a response. If a correct response is given in step 24, then the routine branches to step 25 and the security routine is disabled. Next, in step 18 the boot-up process continues so that the PC operating system can be loaded to permit normal operation of the PC. However, if an incorrect response is given in step 24, or if no response is given within a preset time interval, then in step 26 an authentication failure message is displayed. For example, the message may recite: "Distribution Channel Authentication Failure". Additional instructions may also be displayed, such as the manufacturer's toll-free telephone number, to help resolve any problems. Next in step 28, after a preset time limit expires, the PC shuts down without allowing any further operation. The PC may be powered off, and then switched on again to restart the process at step 12 of FIG. 1. If authentication failed previously, then the security routine will again find the special code or certificate and prompt the user for information before permitting normal PC operation. Therefore, a PC containing the special code or certificate cannot be operated until a correct response is given. It is contemplated that widespread advertising of this security measure will deter theft of PC's in the distribution channel.

The enabling process of step 22 requires the user to respond in a predetermined manner. The response can take many forms. For example, a code may have been pre-installed by the PC manufacturer that requires a distributor or retailer to provide a secret password to a consumer. The password may have been provided in advance to the retailer or distributor either by mail, courier, via the Internet to a personal digital assistant device, by telephone, or in some other manner separate from the delivery of the PC.

Alternately, in step 22 the retailer or distributor may be prompted to call the manufacturer to verify that the computer has been received. At that time the telephone number can be checked by the manufacturer to verify correct delivery of the PC, and then the manufacturer may orally provide a password or other instructions to enable use of the electronic device. Other authentication methods may include connecting the PC to a telephone line and having the PC automatically dial the manufacturer for authentication, connecting the PC to a network to access an authentication code, and/or having the PC distributor insert a special token supplied by the manufacturer into a reader device connected to an input port during boot-up for verification by the machine. Alternately, the manufacturer may supply smart cards having magnetic strips containing a special bar code or other data, and may supply card readers to the retailer or distributor. The cards may be swiped in the card readers, which could connect to a USB port of the PC. Further, some combination of the above processes could be used to verify that a retailer, distributor, or other user is authorized to use the PC or other electronic device.

In an implementation, after authentication is successful, then the manufacturer-installed special code or certificate is disabled. This may automatically occur within the electronic device, or may be caused to occur by special code transmitted by the manufacturer to the device after a correct response is received. Thus, the next time the electronic device is turned on, either the security routine will not be run or will not find any special code or certificate, and a system message requiring verification will not be displayed. A user will then be able to operate the PC normally.

The method may be implemented in electronic devices which include at least one of several security primitives, such as electronic hardware subsystems and/or storage capability for software code. Examples of security primitives include, but are not limited to, protected storage areas of one or more memory chips, hardware or software random number generators, public key-based software, and verification software.

Figure 2:
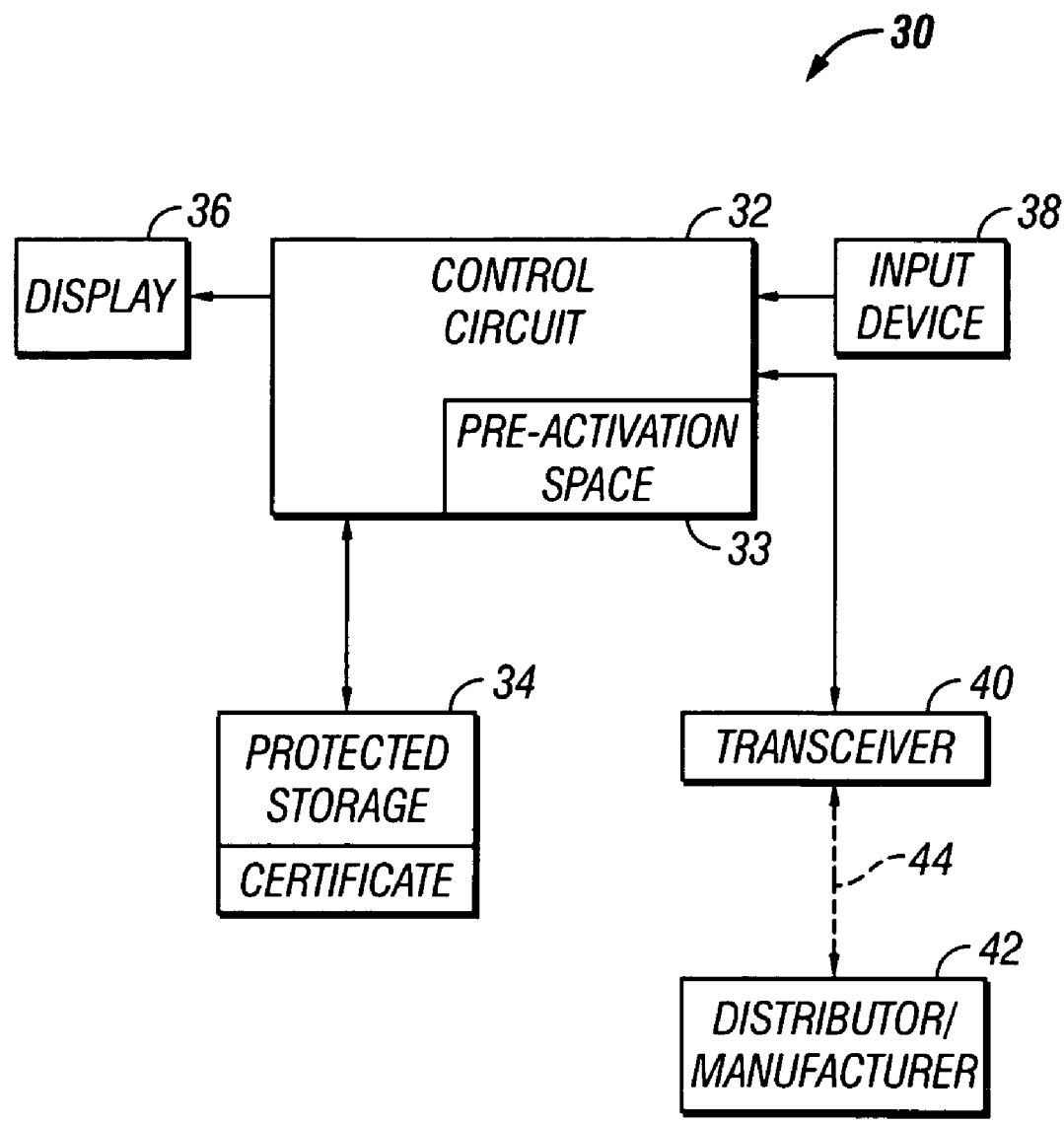
FIG. 2 is a simplified block diagram of an electronic device suitable for implementing the technique according to the invention.

FIG. 2 is a simplified block diagram of an electronic device 30 suitable for implementing of the technique for deterring theft. Control circuitry 32, such as a controller or microprocessor having access to a pre-activation space or pre-boot space 33, is connected in two way communication with a protected storage device 34. The manufacturer of the electronic device loads the security routine in the pre-activation space 33, and loads a digital certificate in the protected storage device 34, which may be a read-only-memory (ROM) device. A display 36 such as an LED array, an input device 38 such as a keypad, and a transceiver 40 such as a modem are also connected to the control circuit 32. A connection between the electronic device 30 and a distributor or manufacturer 42 may be made, for example, via a telephone line 44.

An electronic device such as a washing machine, for example, that does not include a transceiver may still utilize the method. When the washing machine is delivered to the retailer, it is turned on and the control circuit 32 a initiates an activation process that runs the security routine in the pre-activation space 33 which recognizes a digital certificate stored in protected storage 34. The control circuit instructs the retailer via a display 36 to dial a special telephone number to speak to the manufacturer 42 for further instructions. When the retailer complies, the manufacturer verifies the retailer's telephone number and may request information such as the serial number of the washing machine. The manufacturer then divulges a sequence of control knob settings, or pushbutton depressions, or keypad depressions to implement. When the retailer follows these directions, the control circuit 32 enables the washing machine to operate in a normal manner and alters the activation routine to ignore the digital certificate in the future. Thus, the next time the washing machine is turned on (by a consumer), it will operate normally.

Another example concerns a device, such as a PC, that includes a transceiver 40. In this case, the authentication procedure can be substantially automatic. In particular, when the PC is received by a distributor and a turned on, the control circuit 32 (CPU) initiates a boot-up process and recognizes a digital certificate stored in the BIOS. A message is displayed on the PC monitor 36 instructing the distributor to connect transceiver 40 to a telephone line and then to push a key of the input device 38 (keyboard). When the distributor complies, the PC automatically calls the manufacturer and transmits a copy of the digital certificate for verification. After the manufacturer verifies the certificate and the source telephone number as legitimate, instructions are transmitted to the control circuit 32 that enables the PC to operate in a normal manner and that either deletes the digital certificate or alters the security routine in the BIOS to ignore the digital certificate in the future. Thus, the next time the PC is turned on (by a consumer), it will operate normally without implementing the verification process. For electronic devices that do not typically include a transceiver 40, the manufacturer may supply a transceiver to the distributor for the express purpose of verifying receipt of such electronic devices.

In an alternate implementation, after the sale of the PC, a consumer is instructed to connect the transceiver 40 to a telephone line and then prompted by the manufacturer for information. The information may be supplied to the PC consumer by the retailer at time of sale to authorize use of the PC. After the initial authentication process the consumer would not be required to input the authorization information again.

Referring again to FIG. 2, the control circuit 32 may be a CPU or any other type of decision-making component, and the protected storage 34 may be a ROM chip or any other type of protected memory. The display 36 may be a CRT monitor, a flat-panel display, a LED array, a LCD screen, an audio indicator, a printer or any other device capable of providing messages and/or instructions. The input device 38 may be a keyboard, a keypad, a computer mouse, a microphone, a scanner, a token reader, any type of dial or knob, or may be incorporated as a touch-screen with the display device 36. Lastly, the transceiver 40 may be a modem, a cable modem, a wireless transceiver, a LAN connection, or any other transceiver device for two-way communications.

The technique thus may find use in many different types of electronic devices such as television sets, electronic dishwashers, dryers, other major appliances containing control circuitry, stereo receivers, compact disk players, tape decks, and other stereo components. Further, large ticket items such as automobiles, boats, airplanes and helicopters that employ sophisticated computer controlled systems could use the described method to deter theft in the product distribution channel.

Although examples of implementations have been described, they are merely illustrative and are not restrictive of the broad invention. For example, the security measure may be extended to include consumers who buy electronic devices directly from the manufacturer, which devices are shipped to an office or residence. Consequently, other implementations are within the scope of the following claims.

What is claimed is:

1. A method for deterring theft of an electronic device, comprising:
   installing security data in a protected storage area; and
   installing a security routine operable during an activation process to check for the security data when the device is powered on, the security routine including
      establishing a network connection with a manufacturer of the electronic device during the activation process,
      prompting the manufacturer over the network connection for a network authorization in response to finding the security data, receiving the network authorization before permitting an initial use of the device, and continuing the activation process based on the manufacturer responding correctly.

2. The method of claim 1, wherein the security routine further comprises shutting down the device based on the information being incorrect.

3. The method of claim 2, wherein the security routine further comprises displaying manufacturer contact information before said shutting down.

4. The method of claim 1, further comprising disabling the security routine following successful activation.

5. The method of claim 1, further comprising disabling the security data following successful activation.

6. The method of claim 1, wherein the security routine further comprises requiring a user to provide at least one of a password, a special token, oral authentication, or a network authorization before enabling use of the device.

7. The method of claim 1, wherein the security routine further comprises permitting use of the device in response to a failure to find the security data.

8. A method, comprising:

installing a security routine in a basic input/output system (BIOS) of a personal computer (PC), the security routine operable during a boot-up process to check a protected storage area for security data, the boot-up process to ensure that components of the personal computer operate correctly, the security routine comprising:

stopping the boot-up process, establishing a network connection, and prompting for a network authorization over the network connection in response to the security data being found;

receiving the network authorization responsive to the prompting;

maintaining the stop of the boot-up process based on the network authorization being unacceptable;

proceeding with the boot-up process based on the network authorization being acceptable or in response to the security data not being found; and disabling the security routine after the acceptable network authorization is provided.

9. The method of claim 8, wherein the security routine further comprises shutting down the PC based on the network authorization being incorrect.

10. The method of claim 9, wherein the security routine further comprises displaying an authentication failure message before shutting down.

11. The method of claim 8, further comprising disabling the security data after the acceptable network authorization is provided.

12. The method of claim 8, wherein the security routine further comprises requiring a user to provide at least one of a password, a token, or an oral authentication before enabling use of the device.

13. Computer software embodied in a computer-readable medium, the software comprising instructions for causing an electronic device to:

before permitting use of the device, execute a security routine during a boot-up process to determine whether to permit a user to operate the electronic device, the security routine including establishing a network connection;

enabling the user to operate the electronic device based on receiving an acceptable network authorization over the network connection; and preventing the user from operating the electronic device based on receiving an unacceptable network authorization over the network connection; and permanently deactivate the security routine after the acceptable network authorization is received.

14. The software of claim 13, further comprising instructions to display manufacturer contact information when the unacceptable network authorization is received.

15. The software of claim 13, further comprising instructions to execute the security routine during the boot-up process, the boot-up process ensuring that components of the electronic device operate correctly.

16. A method comprising:

starting a boot-up routine of an electronic device, the routine including checking a protected storage area for security data to identify an entity permitted to use the electronic device, in response to locating the security data and before permitting use of the device, establishing a network connection, transmitting information over the network for authentication, receiving data over the network to identify that the entity is permitted to use the electronic device based on the data satisfying a predetermined criterion, and disabling the security routine after the acceptable network authorization is provided, and in response to a failure to locate the security data, allowing the boot-up routine to continue so that the device becomes operable.

17. The method of claim 16, wherein starting the boot-up routine comprises ensuring that components of the electronic device operate correctly.

18. The method of claim 16, further comprising, in response to locating the security data:

receiving an input from a user; and identifying that the user is permitted to use the electronic device using the received input and the located security data.

19. The method of claim 18, further comprising, in response to locating the security data, prompting the user for the input.

20. The method of claim 16, wherein transmitting information over the network comprises transmitting information over a telephone network.

21. A method for deterring theft of an electronic device, comprising:

installing security data in a protected storage area; and installing a security routine operable during an activation process to check for the security data when the device is powered on, the security routine including in response to a failure to find the security data, permitting use of the device, in response to finding the security data, establishing a network connection with a manufacturer of the electronic device during the activation process, prompting the manufacturer over the network connection for a network authorization in response to finding the security data, and receiving the network authorization before permitting an initial use of the device.

22. A method, comprising:

installing a security routine in a basic input/output system (BIOS) of a personal computer (PC), the security routine operable during a boot-up process to check a protected storage area for security data, the boot-up process to ensure that components of the personal computer operate correctly, the security routine comprising:

stopping the boot-up process, establishing a network connection, and prompting for a network authorization over the network connection in response to the security data being found;

receiving the network authorization responsive to the prompting;

maintaining the stop of the boot-up process based on the network authorization being unacceptable;

proceeding with the boot-up process based on the network authorization being acceptable or in response to the security data riot being found; and disabling the security data after the acceptable network authorization is provided.

* * * * *